United States Patent
Chou et al.

(10) Patent No.: US 6,717,465 B2
(45) Date of Patent: Apr. 6, 2004

(54) ACTIVE HARMONIC SUPPRESSION EQUIPMENT AND CONTROL METHOD THEREFOR

(75) Inventors: Hurng-Liang Chou, Kaohsiung (TW);
Chin-Chang Wu, Kaohsiung (TW);
Ya-Tsung Feng, Kaohsiung (TW);
Yao-Jen Chang, Kaohsiung (TW)

(73) Assignee: UIS Abler Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/331,766

(22) Filed: Dec. 31, 2002

(65) Prior Publication Data

US 2003/0169109 A1 Sep. 11, 2003

(30) Foreign Application Priority Data

Mar. 11, 2002 (TW) ........................................ 91104791 A

(51) Int. Cl.[7] ................................................. H03F 1/26
(52) U.S. Cl. ........................ 330/149; 330/297; 363/17
(58) Field of Search ............................ 330/149, 10, 51, 330/7 A, 97; 363/17

(56) References Cited

U.S. PATENT DOCUMENTS 6,282,111 B1 * 8/2001 Illingworth .................. 363/98
6,396,725 B1 * 5/2002 Jacobs et al. ................ 363/131
6,483,724 B1 * 11/2002 Blair et al. .................... 363/17

\* cited by examiner

*Primary Examiner*—Henry Choe
(74) *Attorney, Agent, or Firm*—Bacon & Thomas, PLLC

(57) ABSTRACT

An active harmonic suppression equipment is consisted of a dc capacitor, a power converter, a serially connected inductor/capacitor set, a C-R-C filter set and a control circuit. The dc capacitor operates as an energy storage device and supplies a dc voltage, and the power converter electrically connected thereto is used to convert the dc voltage into a compensating voltage. The inductor/capacitor set and the C-R-C filter set are commonly converting the compensating voltage into a compensating current injecting into a power feeder in order to suppress harmonic currents generated by nonlinear loads, thereby adjusting an utility current to be approximated as a sine-wave.

10 Claims, 3 Drawing Sheets

ACTIVE HARMONIC SUPPRESSION EQUIPMENT AND CONTROL METHOD THEREFOR

BACKGROUND OF THE INVENTION

1. Field of the Invention

The present invention is related to an active harmonic suppression equipment and control method therefor, and it is particularly applied in parallel connection with non-linear loads, so as to suppress harmonic current generated by nonlinear loads.

2. Description of the Related Art

Recently, the characteristics of power electronic devices have been improved significantly. The power electronic devices with high-voltage rating, high-current rating, and high switching speed have been developed due to the improvement of semiconductor manufacturing technique. Power electronic devices are applied in electric power equipment, such as switching power supply, uninterruptible power supply, motor driver, arc furnace, trolley car, battery charger, and lighting appliance etc. The electric power equipment may generate a large amount of harmonic current due to the nonlinear input characteristic of such loads. The harmonic current will pollute the power system, and it results in the problems such as transformer overheat, rotary machine vibration, degrading voltage quality, electric power components destruction, medical facilities malfunction etc. In order to improve the problem of harmonic pollution effectively, many harmonic limitation standards, such as IEEE519-1992, IEC1000-3-2, and IEC1000-3-4 etc., have been established. Therefore, how to solve the harmonic problem is an important topic in the power system today.

Conventionally, the passive power filter is used to solve the problems of harmonic. The passive power filter is consisted of some passive elements, such as inductor, capacitor and resistor. The tuner filter is the widely used passive power filter, and it can attenuate the harmonic current near the tuning frequency. The passive power filter has the disadvantages that (1) sensitive to the variation of utility impedance, (2) sensitive to frequency variation, (3) having the risk of series/parallel resonance, (4) fixed filtering frequency.

The most serious of the above disadvantages is the series/parallel resonance. The series/parallel resonance may result in over-current/over-voltage of inductor and capacitor, and it will damage the passive power filter. Since the utility impedance has a significant effect on the performance of passive power filter, it is very hard to obtain an excellent filter performance in practical application. Moreover, the harmonic currents produced by neighboring nonlinear may flow into the passive power filter and result in the overload of the passive power filter.

Recently, the harmonic suppression equipment based on power electronic technique has been developed. This harmonic suppression equipment can suppress the different order harmonic components of the nonlinear loads simultaneously using only the same harmonic suppression equipment. It is named as an active power filter. FIG. 1 illustrates a system single-line diagram of a traditional active power filter. Referring to FIG. 1, this diagram includes a filter inductor, a power converter, and a dc capacitor. The power converter is used to generate a compensating current via the filter inductor to inject into a power feeder. The role of the filter inductor is used for suppressing high frequency ripple current due to the switching behavior of the power converter. The inductance of filter inductor depends on the factors of switching frequency, dc voltage and ripple current. The dc capacitor located in the dc bus of power converter is operated as an energy buffer. Although, the traditional active power filter is capable of suppressing harmonic, it has the following disadvantages:

(1). In order to suppress the ripple current from the power converter, the filter inductor with a large inductance is used.

(2). A higher dc bus voltage of power converter is required, and it results in the high voltage rating of dc capacitor and power electronic devices.

(3). Using a larger filter inductor will result in the larger power loss, poor energy efficiency, more heat dissipation, bulk dimension and weight.

(4). Using a larger filter inductor also results in the degrading of the high frequency response.

The present invention intends to provide a new active harmonic suppression equipment which improves the above-mentioned problems of the traditional passive power filter and the traditional active power filter. The inventive active harmonic suppression equipment comprises a power converter, a capacitor/inductor set in which the capacitor is connected in serial with the inductor, a C-R-C filter set, a dc capacitor bank, and a control circuit. The inventive active power filter can reduce the dc bus voltage of power converter significantly. Hence, it can reduce the voltage rating of the dc capacitor and power electronic devices as well as the inductance of the inductor. The inventive active power filter generates harmonic current which is opposite to that of nonlinear load, and it also supply a constant reactive power according to the capacitance of the capacitor in the capacitor/inductor set. The fundamental component of feeder voltage drops mainly in the capacitor of the capacitor/inductor set, and the power converter only generates harmonic voltage. Then, the dc bus voltage of power converter can be reduced and the ripple amplitude of power converter output current is also reduced. Hence, the inductance of the capacitor/inductor set will be smaller due to the smaller ripple current. It means that the high frequency response of the inventive active power filter is better than that of the traditional active power filter. The salient benefits of the inventive active power filter are the low voltage rating of dc capacitor, low voltage rating of power electronic devices, smaller inductor, and the better filtering performance.

SUMMARY OF THE INVENTION

The primary objective of this invention is to provide a new active harmonic suppression equipment and control method therefor which comprises a power converter, a capacitor/inductor set in which the capacitor and inductor are serial link, a C-R-C filter set, a dc capacitor bank and a control circuit. The power converter converts a dc voltage to a compensating voltage which is further converted into a compensating current by the capacitor/inductor set and a C-R-C filter set, and then is injected into a power feeder to cancel harmonic currents generated by nonlinear loads so that the utility current waveform is approached to non-distorted sinusoid.

The present invention is an active harmonic suppression equipment and control method therefor. The active harmonic suppression equipment comprises, a power converter, a serially connected capacitor/inductor set, a C-R-C filter set, a dc capacitor bank and a control circuit. The dc capacitor bank is used as an energy storage device, and the power converter electrically connected thereto is used to convert the dc voltage of dc capacitor bank into a compensating voltage. The inductor in a serially connected capacitor/inductor set is used to smooth the waveform of power converter output voltage, and the capacitor in a serially connected capacitor/inductor set is used to supply the reactive power. The C-R-C filter set is used to filter out the high frequency ripple due to the switching operation of power converter. The serially connected capacitor/inductor set and the C-R-C filter set are converting the compensating voltage into a compensating current, and it is injecting into power feeder in order to filter harmonic currents generated by nonlinear loads. Then, the utility current is approximated to be sinusoidal.

The control method for the inventive active harmonic suppression equipment detects the load current, the utility current, the output current of power converter and the voltage of the dc capacitor bank to calculate an expected compensating voltage of the power converter. Then, the expected compensating voltage of the power converter is sent to the pulse width modulator, and the output signals of pulse width modulator are used to drive the power switching devices of the power converter to generate the compensating voltage. Then the compensating voltage is converted into a compensating current via a serially connected capacitor/inductor set and a C-R-C filter set, and the compensating current is injected into the power feeder in order to filter the harmonic currents generated by nonlinear loads. Then, the utility current is approximated to be sinusoidal.

Other objectives, advantages and novel features of this invention will become more apparent from the following detailed description and the accompanying drawings.

BRIEF DESCRIPTION OF THE DRAWINGS

The present invention will now be described in details with references to the accompanying drawings herein.

DETAILED DESCRIPTION OF THE INVENTION

Figure 1:
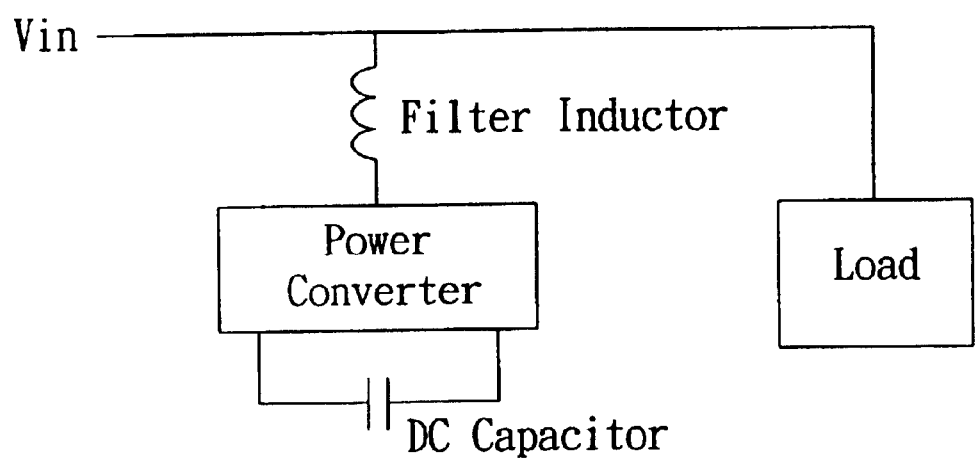
FIG. 1 is a system single-line diagram for a traditional active power filter.
Figure 2:
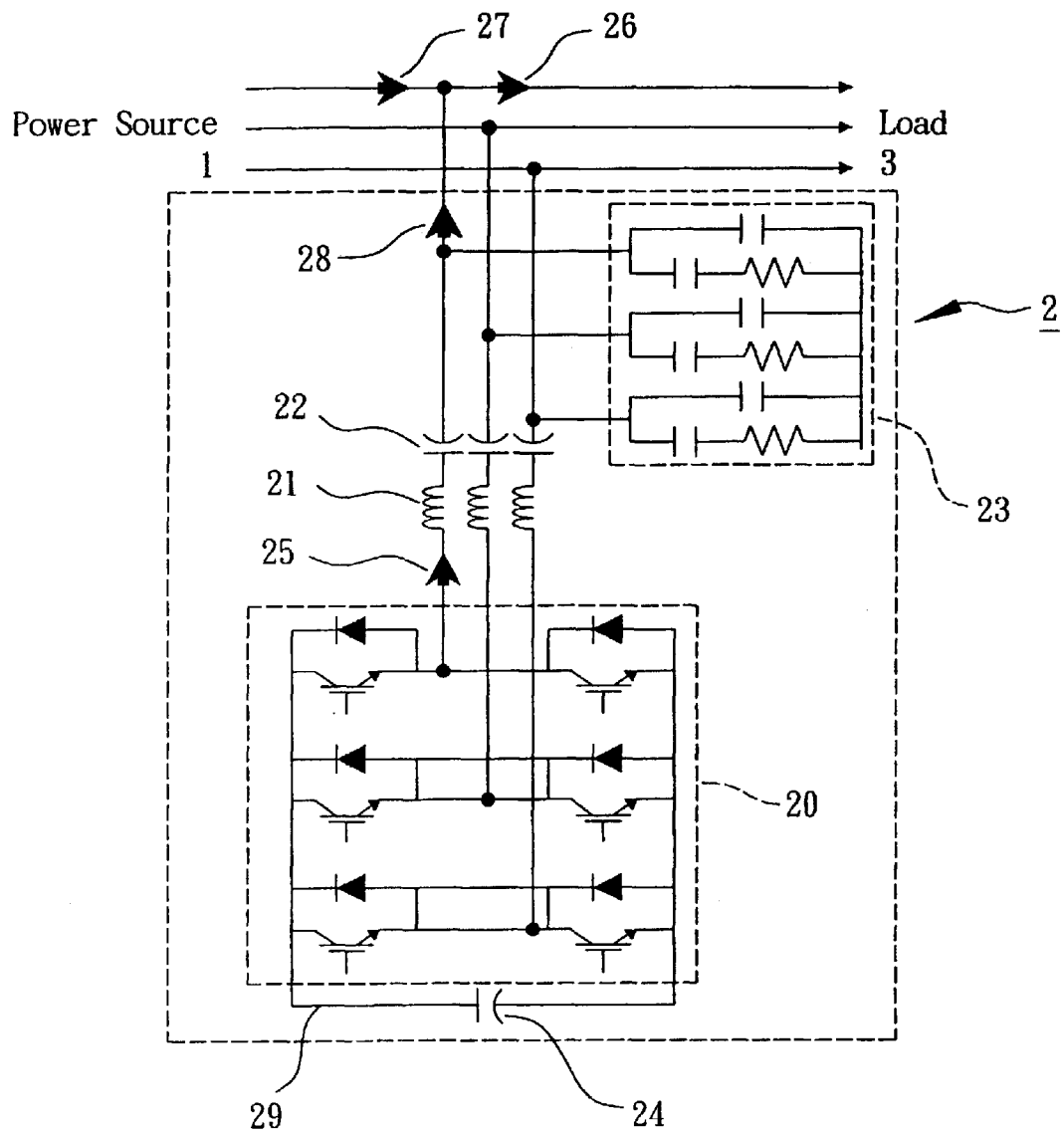
FIG. 2 is a system single-line diagram for an active harmonic suppression equipment in accordance with an embodiment of the present invention.

FIG. 2 illustrates a system single-line diagram for the active harmonic suppression equipment in accordance with an embodiment of the present invention. Referring to FIG. 2, the power source 1 generates power to the load 3, and the active harmonic suppression equipment 2 is connected parallel with the load 3. The load 3 is a nonlinear load, and it will generate the harmonic current. The active harmonic suppression equipment 2 comprises a power converter 20, a serially connected inductor 21/capacitor 22 set, a C-R-C filter set 23, a dc capacitor bank 24, and a control circuit. The dc capacitor bank 24 is an energy storage element of the equipment 2 with a de voltage 29. The power converter 20 electrically connected thereto is converted the dc voltage 29 into a compensating voltage. The serially connected inductor 21/capacitor 22 set, and the C-R-C filter set 23 are commonly converting the compensating voltage into a compensating current 28, and it is injecting into a power feeder in order to filter the harmonic current generated by load 3, thereby adjusting a utility current 27 to be approximated as a sine-wave. In addition to harmonic suppression, the active harmonic suppression equipment 2 is capable of supplying a constant reactive power whose value is determined by the capacitor of serially connected inductor 21/capacitor 22 set.

Referring again to FIG. 2, a control method for the active harmonic suppression equipment 2 detects the load current 26, the utility current 27, the output current 28 of the power converter 20, and the dc voltage 29 of the dc capacitor bank 24 to calculate an expected compensating voltage of the power converter 20. Then, the power converter 20 converts the dc voltage 29 to the compensating voltage. The serially connected inductor 21/capacitor 22 set, and the C-R-C filter set 23 are commonly converting the compensating voltage into a compensating current 28, and it is injecting into power feeder in order to filter the harmonic current generated by load 3, thereby adjusting a utility current 27 to be approximated as a sine-wave.

Figure 3:
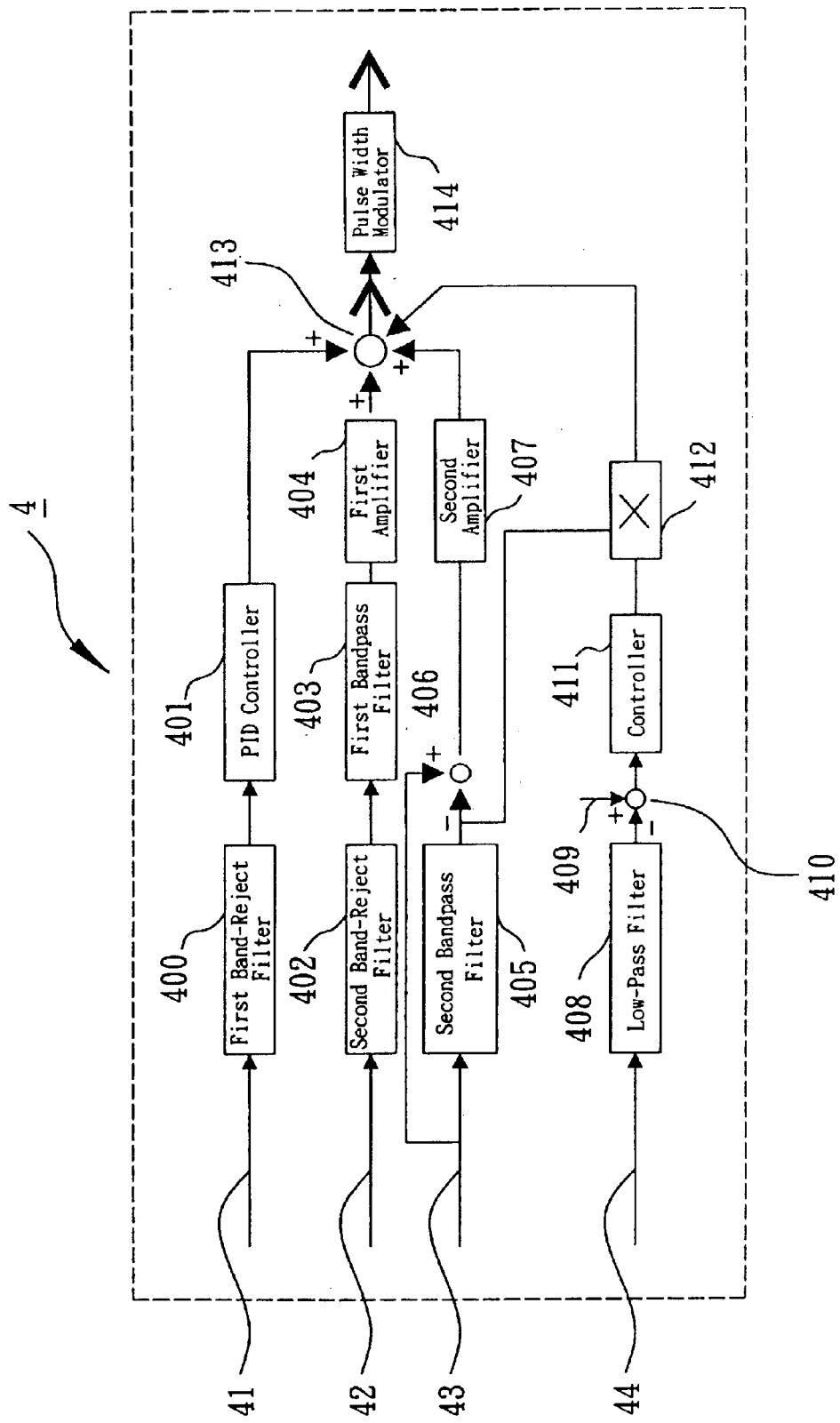
FIG. 3 is a control block of the active harmonic suppression equipment in accordance with an embodiment of the present invention.

FIG. 3 illustrates a control block diagram for the active harmonic suppression equipment 2 in accordance with an embodiment of the present invention and the control block diagram includes four paths. In order to generate the harmonic components of load current 26, the output compensating voltage of power converter 20 must be equal to the multiplying result of harmonic components of the load current 26 and the impedance of the serially connected inductor 21/capacitor 22 set. In the first path 41 a fundamental component of the load current 26 is filtered out to obtain the harmonic components by using a first band-rejection filter 400. Because the voltage of the inductor can be obtained by differential of its current, the voltage of the capacitor can be obtained by integration of its current, and the voltage of the resistance can be obtained by multiplying result of its current and a constant value. The output of the first band-rejection filter 400 is fed to a Proportional Integral Differential (PID) controller 401. Then, the voltage for generating the harmonic components of the load current 26 is obtained. In theory, if the power converter 20 can generate a harmonic voltage by using the first control paths 41 and convert into a compensating current by the serially connected inductor 21/capacitor 22 set, the harmonic components of the load current 26 can be compensated. The filtering performance is degraded due to the values of the serially connected inductor 21/capacitor 22 set will be different in different harmonic components and the stray effects of the inductor and capacitor cannot be avoided in practical application. For improving the compensating performance, the second control path 42 is used to modify the error of the compensating results of the first control paths 41. In the second control path 42, the detected utility current 27 is sent to the second band-rejection filter 402 to filter out the fundamental component. Then, uncompensated harmonic components of the utility current 27 are obtained. The output of the second band-rejection filter 402 is fed to the first band-pass filter 403 which is configured by several specified frequency band-pass filters. The output of the first band-pass filter 403 is fed to the first amplifier 404. Then, the uncompensated harmonic components of the utility current 27, which has not been compensated by the first control path 41, will be further compensated. The third control path 43 is used to generate a virtual harmonic damping resistor to be connected in serial with the serially connected inductor 21 and capacitor 22 set for preventing the serially connected inductor 21/capacitor 22 set from high frequency oscillation. The output current 25 of the power converter 20 is sent to a second band-pass filter 405 to obtain the fundamental component, and then the output current 25 of the power converter 20 and its fundamental component are fed to a subtractor 406 to obtain the harmonic components. The harmonic components are fed to the second amplifier 407. The power converter 20 utilizes the third control path 43 to provide a virtual harmonic damping to prevent from high frequency oscillation. The fourth control path 44 is used to regulate the dc voltage of the dc capacitor bank 24. The fourth control path 44 comprises a low-pass filter 408 being adapted to filter out the ripple of the dc voltage 29 of the dc capacitor bank 24, a subtractor 410 being adapted to subtract a setting voltage 409 from the output of low-pass filter 408, and a controller 411 being adapted to input the subtracted voltage from the subtractor 410. An output signal is obtained from a multiplier 412 after multiplying the output of the controller 411 and the output of the second band-pass filter 405. Since the output of the second band-pass filter 405 is the fundamental components of the output current 25 of the power converter 20, the fourth control path 44 may control the power converter 20 either absorbing or consuming real power, so as to maintain the dc voltage 29 of the dc capacitor bank 24 as a constant value. Finally, it can obtain the reference signal by adding the output signals of the first, second, third, and fourth control paths in the adder circuit 413. Then, the reference signal is sent to a pulse-width modulator 414 so as to obtain signals being used to drive the power switching devices of the power converter 20.

Since the power converter 20 is connected in series with the serially connected inductor 21/capacitor 22 set, the fundamental component of feeder voltage is dropped across the serially connected inductor 21/capacitor 22 set. The power converter 20 is used to generate only the harmonic voltage, and the dc voltage of the dc capacitor bank 24 is lowered than the conventional active power filter. Thus, the high frequency ripple current produced by the power converter 20 is smaller. Therefore, the control method for the active harmonic suppression equipment 2 in accordance with the present invention is capable of adapting a smaller filter inductor in serially connected inductor 21/capacitor 22 set, so that the entire dimensions, weight, and power loss of the filter inductor is reduced. The power converter 20 in accordance with the present invention has a dc voltage lower than that of the traditional active electric power filter resulting in a smaller ripple current if the inductance of filter inductor is the same. Moreover, the voltage rating of power switching devices and electrical magnetic interference (EMI) of power converter 20 is also smaller than that of conventional active electric power filter.

Although the invention has been described in details with references to its presently preferred embodiment, it will be understood by one of ordinary skill in the art that various modifications can be made without departing from the spirit and the scope of the invention, as set forth in the appended claims.

What is claimed is:

1. An active harmonic suppression equipment comprising:
    a serially connected capacitor/inductor set consisting of a reactive power compensation ac capacitor and a filter inductor; while an impedance thereof is in fundamental frequency, the serially connected capacitor/inductor set performs as a capacitor and has fundamental reactive compensating function; while the impedance thereof is in high frequency, the serially connected capacitor/inductor set performs as an inductor and has filtering function used to filter high frequency switching harmonic current; the serially connected capacitor/inductor set electrically connected to a power feeder;
    a C-R-C filter set connected to the power feeder and used to filter high frequency switching harmonic current;
    a dc capacitor bank performing as an energy storage element and providing a dc voltage;
    a power converter converting the dc voltage into a compensating voltage which is flowing through the serially connected capacitor/inductor set, and the C-R-C filter set to produce a compensating current which is injected into the power feeder to suppress harmonic currents generated by nonlinear loads, thereby adjusting a utility current to be approximated as a sine-wave; and
    a control circuit detecting the load current, the utility current, the output current of the power converter and the voltage of the dc capacitor to calculate a reference voltage of the power converter and signals which are used to drive the power converter.

2. The active harmonic suppression equipment as defined in claim 1, wherein the power converter comprises power switching devices, a pulse width modulating signal modulated from a pulse width modulator used to drive the power switching devices and thereby convert the dc voltage provided from the dc capacitor into the compensating voltage.

3. The active harmonic suppression equipment as defined in claim 1, the C-R-C filter set consists of a first capacitor, a resistor in series connection thereto and a second capacitor in parallel connection thereto; the C-R-C filter set electrically.

4. The active harmonic suppression equipment as defined in claim 1, wherein the control circuit contains a first control path, a second control path, a third control path, a fourth control path, and a pulse width modulator.

5. The active harmonic suppression equipment as defined in claim 4, the first control path of the control circuit retrieves the load current and a harmonic component thereof is obtained by a band-rejection filter filtering fundamental components, a voltage drop of a load harmonic current on the serially connected capacitor/inductor set is obtained via a PID controller and signals output from the first control path are initially adjusted for harmonic suppression.

6. The active harmonic suppression equipment as defined in claim 4, wherein the second control path of the control circuit retrieves the utility current and specified harmonic components thereof are obtained by a band-rejection filter and a set of band-pass filters, an output signal of the second control path is obtained while passing through an amplifier, errors of the first control path is fine adjusted by the second control path which is used to suppress the load harmonic current.

7. The active harmonic suppression equipment as defined in claim 4, wherein the third control path of the control circuit retrieves an output current of the power converter and a fundamental component thereof is obtained by a band-pass filter, a harmonic component is obtained from a subtractor in which subtracting the fundamental component from an output current of the power converter, and amplified by an amplifier to produce output signals, the third control path operates the power converter as a virtual harmonic resistor serially connected to the serially connected capacitor/inductor set to thereby result in harmonic damping and prevent from occurrence of oscillation.

8. The active harmonic suppression equipment as defined in claim 6, wherein the fourth control path of the control circuit retrieves a voltage of the dc capacitor bank which compares with a setting voltage in a controller, an output signal of the fourth control path is obtained multiplying an output of the controller by the fundamental component of the output current of power converter produced by the band-pass filter of the third control path, the fourth control path used to regulate the dc capacitor voltage.

9. The active harmonic suppression equipment as defined in claim 4, wherein signals of the first, second, third and fourth control path are added to produce a reference signal, converted into a pulse width modulated signal by the pulse width modulator, and used to drive power switching devices of the power converter; the power converter converting the dc voltage into the compensating voltage which is successively passed through the serially connected capacitor/inductor set and the C-R-C filter set to produce the compensating current which is injected into the power feeder to filter harmonic currents generated by nonlinear loads, thereby adjusting the utility current to be approximated as a sine-wave.

10. An control method for an active harmonic suppression equipment comprising steps:

a control circuit retrieving a load current, an utility current, an output current of a power converter, and a voltage of a dc capacitor, and thereby calculating an expected voltage as well as a reference signal; signals modulating from a pulse width modulator used to drive power switching devices of the power converter and convert an dc voltage produced from the dc capacitor into a compensating voltage which is successively passed through a serially connected capacitor/inductor set and a C-R-C filter set to produce a compensating current which is injected into a power feeder to filter harmonic currents generated by nonlinear loads, thereby adjusting the utility current to be approximated a sine-wave.

* * * * *